United States Patent
Petrunka

(10) Patent No.: US 6,584,193 B1
(45) Date of Patent: Jun. 24, 2003

(54) SYSTEM, METHOD, AND COMPUTER PROGRAM PRODUCT FOR NETWORK TELEPHONE QUEUING

(75) Inventor: Robert W. Petrunka, Raleigh, NC (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/354,372

(22) Filed: Jul. 14, 1999

(51) Int. Cl.[7] .............................................. H04M 3/00
(52) U.S. Cl. ........................ 379/266.01; 379/265.02; 379/265.09
(58) Field of Search ........................... 379/221.13, 219, 379/220.01

(56) References Cited

U.S. PATENT DOCUMENTS

| | | | | |
|---|---|---|---|---|
| 5,036,535 A | * | 7/1991 | Gechter et al. | 379/265.11 |
| 5,168,515 A | * | 12/1992 | Gechter et al. | 379/265.04 |
| 5,271,058 A | * | 12/1993 | Andrews et al. | 379/265.11 |
| 5,940,496 A | * | 8/1999 | Gisby et al. | 379/265.02 |
| 6,018,579 A | * | 1/2000 | Petrunka | 379/221.13 |
| 6,226,289 B1 | * | 5/2001 | Williams et al. | 370/385 |

* cited by examiner

Primary Examiner—Ahmad F. Matar
Assistant Examiner—Rasha S Al-Aubaidi
(74) Attorney, Agent, or Firm—John C. Gorecki

(57) ABSTRACT

A network telephone queuing system including a network telephone switch 108 and a queue server 114 associated with switch 108. Switch 108 receives all calls to a SOHO queuing system subscriber 110 regardless of the point of origin of a call. Calls are routed to queue server 114. If no calls are currently queued for subscriber 110, queue server 114 rings SOHO subscriber 110 and instructs switch 108 to establish a connection with subscriber 110 upon answer. Otherwise, queue server 114 places the call in a queue and connects queued calls to an IVR broadcast music trunk 118 while on hold. Queue server 114 attempts to call subscriber 110 periodically and instructs switch 108 to connect the caller at the top of the queue with subscriber 110 when subscriber 110 finally answers the call. Queue server 114 then drops out of the call.

18 Claims, 1 Drawing Sheet

SYSTEM, METHOD, AND COMPUTER PROGRAM PRODUCT FOR NETWORK TELEPHONE QUEUING

FIELD OF THE INVENTION

The present invention relates generally to a network telephone queuing system geared towards small and home offices.

BACKGROUND OF THE INVENTION

Businesses run from small offices or home offices have telecommunications needs similar to those of larger organizations and companies. Specifically, the small office/home office (SOHO) business needs a system for answering calls and organizing callers who cannot be immediately connected.

One option is to purchase or lease, at considerable expense, separate on-site private branch exchange (PBX) equipment that allows calls to be automatically answered and placed in a local queue if no lines are currently available. PBX equipment typically answers incoming calls and routes the calls to open lines. When there are no open lines, the call is placed in a call queue and connected when a line becomes available. During the holding period, the call can be connected to an internal source of music, pre-recorded messages, or the like.

Another option is an existing form of Central Office based network queuing known as Centrex. Centrex was designed to provide services for medium to large businesses, however, and is not tariffed at a rate that a SOHO business could typically afford. Moreover, Centrex is not sized by the Local Exchange Carrier (telephone company) to support the SOHO marketplace. If a Local Exchange Carrier tried to use Centrex to address the SOHO marketplace, it would quickly run out of capacity. In order to increase the capacity of Centrex, a Local Exchange Carrier would have to negotiate with multiple central office vendors at significant expense. Moreover, Centrex is implemented and administered differently by every central office vendor.

The present invention offers an alternative to purchasing or leasing PBX equipment and Centrex. Instead, incoming calls to SOHO subscribers are handled by the Local Exchange Carrier's existing equipment infrastructure. They are not, however, handled in the same manner as Centrex. Incoming calls can be processed in a specially equipped central office switch using advanced call control software such as, for instance, Operator Services Systems/Advanced Intelligent Network (OSSAIN) software. Callers on hold can be connected to a music source while waiting to be connected with the SOHO subscriber they have dialed. By utilizing the Local Exchange Carrier's existing equipment infrastructure, SOHO subscribers are spared the expense and maintenance of PBX call control equipment attached to their incoming phone lines. In addition, by moving the call control elements into the existing infrastructure, subscribers need not pay for equipment and maintenance but rather pay a monthly service charge to the Local Exchange Carrier. The Local Exchange Carrier can achieve economies of scale by co-locating multiple SOHO subscribers in a single queue server and associated switch.

Network queuing for SOHO has several advantages over the Centrex alternative as well. As a new service, it could be tariffed at a rate appropriate for the SOHO market. Moreover, capacity is not an issue for SOHO network queuing. In order to increase SOHO network queuing capacity, the Local Exchange Carrier merely deploys additional network computers. Further, administration is centralized thereby reducing operation costs.

SUMMARY OF THE INVENTION

When a subscriber requests SOHO network queuing from their Local Exchange Carrier (LEC), the subscriber's directory number is logically ported from a Local Number Portability (LNP) perspective. A Location Routing Number (LRN) is associated with the SOHO subscriber's. directory number. The LRN is downloaded into LNP databases in the local area via the Number Portability Administration Center (NPAC). If necessary, table changes are made using standard administration in local switches to add the NPA-NXX of the subscriber to the zone of portability. NPA-NXX refers to that part of a directory number corresponding to the area code and three(3) digit exchange identifying the Local Exchange Carrier's central office.

The LRN is chosen so that it routes all incoming calls to a network telephone switch equipped with Network Queueing for SOHO hardware and software. The existing LNP infrastructure is used to intercept all calls to a SOHO subscriber and route them to a SOHO equipped network switch.

When a call is made to a SOHO subscriber, an LNP dip is done. The LNP database returns the LRN of a Network Queueing for SOHO equipped network switch and the call is intercepted and routed to that Network Queueing for SOHO equipped network switch. At the Network Queueing for SOHO equipped network switch the call is connected to a queue server. If no calls are currently in the queue for the directory number that the SOHO subscriber dialed, the queue server rings the SOHO subscriber in an attempt to connect the call. If the SOHO subscriber answers, the call is connected and the queue server drops out of the call. If there are calls in the queue for the SOHO subscriber, then the present call is placed at the end of the queue and the caller is connected to a broadcast music trunk. The queue server periodically instructs the network switch to ring the SOHO subscriber attempting to connect a queued caller.

If the SOHO subscriber's line is busy or if there is no answer on the line, the caller is connected to a broadcast music trunk and the call is placed into the queue on a first-in-first-out (FIFO) basis. Likewise, the queue server periodically instructs the network switch to ring the SOHO subscriber attempting to connect a queued caller. When the SOHO subscriber answers, the caller at the top of the queue is connected and the queue server drops out of the call.

In accordance with a first embodiment of the present invention is a network telephone queuing system including a network telephone switch and a queue server associated with the switch. The switch receives all calls to a SOHO queuing system subscriber regardless of the point of origin of a call. Calls are routed to the queue server. If no calls are currently queued for a SOHO subscriber, the queue server instructs the network switch to ring the SOHO subscriber and instructs the switch to establish a connection with the subscriber upon answer. Otherwise, the queue server places the call in a queue and instructs the network switch to connect queued calls to a broadcast music trunk while on hold. The queue server attempts to call the subscriber periodically, via the network switch, and instructs the switch to connect the caller at the top of the queue with the subscriber when the SOHO subscriber finally answers the call. The queue server then drops out of the call and all queue server related resources are released including the IVR trunk.

In accordance with a second embodiment of the present invention is a method of queuing callers in a telephone network on behalf of a subscriber. Calls are routed to a specially equipped network telephone switch and associated queue server. Control of the call is given to the queue server in order to determine whether there is an open line with the subscriber. If not, the call is placed into a queue on a first-in-first-out basis. Queued calls are connected to a broadcast music trunk while on hold. The queue server periodically attempts to call the subscriber, via the network switch. When the subscriber finally answers, the queue server instructs the switch to connect the caller at the top of the queue with the subscriber. The queue server then drops out of the call.

The present invention offers several advantages. The Local Number Portability (LNP) infrastructure is utilized to allow the SOHO option to be added to any line. There is minimal network impact since LNP queries are already routinely performed. Moreover, there would be minimal interactive voice response (IVR) usage to guide callers since a thousand callers can be connected to a single broadcast music trunk. In addition, first in first out (FIFO) queuing is guaranteed.

Other aspects and features of the present invention will become apparent to those ordinarily skilled in the art upon review of the following description of specific embodiments of the invention in conjunction with the accompanying figures.

DETAILED DISCLOSURE OF THE EMBODIMENTS

Figure 1:
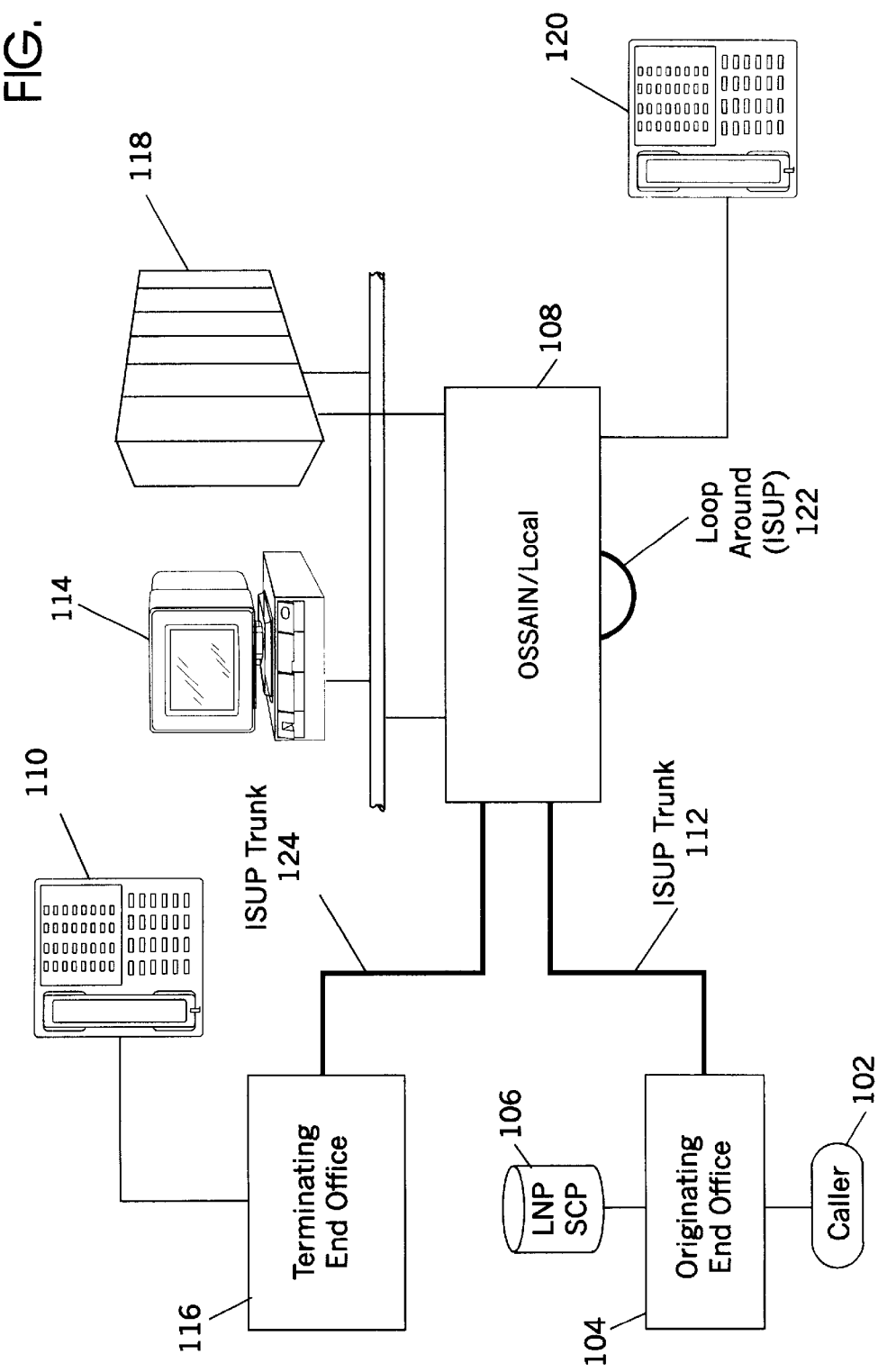
FIG. 1 illustrates various components and data flow used to implement SOHO network queuing according to the present invention.

The present invention uses the existing Local Number Portability (LNP) infrastructure to intercept all calls to a SOHO subscriber and route them to a network switch platform. Local Number Portability is a telephony service which allows subscribers to retain their directory number when they change service providers (existing), geographic locations (planned), or type of service, e.g., POTS to ISDN (planned).

Calls to SOHO subscribers are first routed to a network telephone switch equipped with advanced call control software such as, for instance, Operator Services System/Advanced Intelligent Network (OSSAIN) software. The remaining description references OSSAIN call control software used for the SOHO network queuing system. However, other customized software may be employed to manage the queuing of callers without departing from the spirit or scope of the present invention. As such, reference to OSSAIN should not be construed as limiting the present invention. OSSAIN is merely used as a representative example of queue managing software.

FIG. 1 illustrates various components used to implement the SOHO service option. A caller 102 dials a SOHO subscriber's directory number via the caller's originating end office switch 104. A Local Number Portability (LNP) query is launched with an LNP Service Control Point (SCP) database 106 because the SOHO subscriber's directory number is in a zone of portability. With LNP, when a call is made to a directory number that is in a zone of portability, as determined by the first six digits of the called directory number (known as the area code and exchange, or simply the NPA-NXX), a switch queries an LNP Service Control Point (SCP). The LNP SCP accesses internal databases and returns a Location Routing Number (LRN) to the local switch. The local switch routes the call to a new terminating switch using the LRN. In this case, the new terminating switch is an Operator Support Services/Advanced Intelligent Network (OSSAIN) equipped switch 108. The originally dialed called number is also signalled to the new terminating switch in a Generic Address Parameter (GAP).

The SOHO subscriber's directory number has been logically ported to the OSSAIN equipped switch 108. Thus, every call to a SOHO subscriber 110, regardless of its point of origin, is intercepted for LNP processing since all Local Exchange Carriers and long distance carriers are mandated to implement LNP in a zone of portability.

The call arrives at an OSSAIN equipped switch on an ISUP trunk connection 112. An ISUP trunk connection is an Integrated Services Digital Network User Part that determines the procedures for setting up, coordinating, and taking down trunk calls on the network. Standard translation tools such as using a "T" selector in a pre-translator such as, for instance, in a Nortel Networks & DMS switch, keys on the LRN to route the call to the OSSAIN software within the switch and a queue server 114 associated with switch 108 is given control of the call via an Ethernet type data connection. If no calls are currently in the queue for the directory number of the subscriber 110 dialed, queue server 114 instructs the OSSAIN software to establish an ISUP trunk connection to the SOHO subscriber 110 via the SOHO subscriber's terminating end office switch 116 using the originally dialed called number which was signalled in the GAP parameter. If there are calls in the queue for the directory number dialed, then the present call is placed at the end of the queue and the caller 102 is connected to an interactive voice response (IVR) broadcast music trunk 118 while on hold.

Similarly, if the SOHO subscriber's line is busy or if there is no answer on the line, caller 102 is connected to the IVR broadcast music trunk 118 and the call is placed into the queue on a first-in-first-out (FIFO) basis. Every "x" seconds (where "x" is determined by the Local Exchange Carrier) queue server 114 attempts to reach SOHO subscriber 110 via switch 108. When SOHO subscriber 110 answers, the caller at the top of the queue is connected to SOHO subscriber 110 and queue server 114 and all of its related resources drops out of the call.

Sometimes the SOHO subscriber's line is co-located in the same switch 108 used for SOHO network queuing. When this is the case, the connection between SOHO subscriber 120 and queue server 114 is made via an ISUP loop around trunk 122. Otherwise, when SOHO subscriber 110 and queue server 114 are located separately, connections are made via an ISUP trunk that is preferably a high usage ISUP trunk 124. Moreover, in both cases, the LNP forward call indicator (FCI) parameter is set to indicate that LNP processing is complete. Setting the FCI parameter prevents the call from routing back to the OSSAIN equipped switch.

One advantage of the present invention is the utilization of an IVR broadcast music trunk. Services such as Centrex are typically limited to one interactive voice response (IVR) port per caller. The present invention, however, can connect over a thousand callers to one source. Thus, many SOHO subscribers can be serviced by a single broadcast music trunk IVR.

The present invention also has the ability to keep track of calling statistics for subscribers. These statistics can easily be made available to subscribers in many ways including, but not limited to, web based access, IVR phone access, or monthly mailings. The calling statistics are typically obtained for each queued caller immediately after the caller is removed from the queue. Callers are removed from the queue if they are connected with the subscriber or if they self-terminate the connection by hanging up.

The types of statistics that can be tracked and tallied include, but are not limited to, number of calls received, number of calls answered, number of calls abandoned (caller termination), percentage of calls answered, and percentage of calls answered within 'x' seconds. Moreover, by utilizing caller ID technology, the calling number for abandoned calls can be reported should the subscriber wish to follow up on the 'missed' call.

The subscriber can make tremendous use of these statistics as they indicate to what extent and how calls are being handled. For instance, if the percentage of answered calls is too low, the subscriber can add another line and more staff in order to handle more calls simultaneously. Abandoned calls can be followed up on reducing the number of potentially missed opportunities. The gross number of calls can be linked with sales or the like and used to forecast future earnings. Customer service can be addressed in order to reduce the duration of hold time in the queue if it is unsatisfactory.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, or tape. The media can also be a memory storage device or collection of memory storage devices such as read-only memory (ROM) or random access memory (RAM). Additionally, the computer program code can be transferred to the appropriate hardware over some type of data network.

In the following claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A network telephone queuing system comprising:
a network telephone queuing system switch; and
a queue server associated with said queuing system switch, wherein
said queuing system switch receives all calls to a queuing system subscriber regardless of the network telephone switch of origin;
said queuing system switch routes all calls intended for a queuing system subscriber to said queue server; and
said queue server manages all calls for a queuing system subscriber;
wherein said queuing system switch receives all calls as a result of:
receiving a telephone call into an original switch made to a directory number in a zone of portability as determined by NPA-NXX digits of the directory number called;
in the original switch, querying an Local Number Portability (LNP) SCP for a location routing number for said queuing system switch;
in the LNP SCP, performing an internal database search for the location routing number of said queuing system switch and returning the location routing number to the original switch; and
in the original switch, routing the call including the directory number called, via the location routing number, to the queuing system switch.

2. The system of claim 1 further comprising:
having said queue server instruct said queuing system switch to attempt to establish a connection with said subscriber.

3. The system of claim 2 further comprising:
having said queue server place calls into a queue if a connection with said subscriber cannot be established.

4. The system of claim 3 further comprising:
periodically having said queue server attempt to call said subscriber, via said queuing system switch, and instructing said queuing system switch to connect the caller at the top of the queue with the subscriber if the subscriber answers.

5. The system of claim 3 further comprising:
a broadcast music trunk connected to said queuing system switch wherein said queue server connects a queued call to said broadcast music trunk while the call is in the queue.

6. The system of claim 3 further comprising:
having the queue server handle the queue on a first-in-first-out basis.

7. The system of claim 3 further comprising:
having the queue server collect statistics about each caller in the queue.

8. The system of claim 7 further comprising:
posting said statistics on a web-site accessible to said subscriber.

9. A method of queuing callers in a telephone network on behalf of a subscriber comprising the steps of:
routing a call intended for said subscriber to a specially equipped network telephone switch and associated queue server;
giving control of the call to said queue server;
having said queue server instruct said switch to attempt to establish a connection with the subscriber; and
placing the call into a queue if a connection with the subscriber cannot be established;
wherein said step of routing a call comprises the steps of:
receiving a telephone call into an original switch made to a directory number in a zone of portability as determined by NPA-NXX digits of the directory number called;
in the original switch, querying an Local Number Portability (LNP) SCP for a location routing number for said specially equipped network telephone switch;
in the LNP SCP, performing an internal database search for the location routing number of said specially equipped network telephone switch and returning the location touting number to the original switch; and in the original switch, routing the call including the directory number called, via the location routing number, to the specially equipped network telephone switch.

10. The method of claim 9 further comprising the step of:
connecting queued calls to a broadcast music trunk.

11. The method of claim 9 further comprising the step of:
having said queue server periodically attempt to call the subscriber; and having said queue server instruct said specially equipped network telephone switch to attempt to establish a connection with the subscriber; and leaving the call in the queue if a connection with the subscriber cannot be established.

12. The method of claim 11 further comprising the step of:
having said queue server collect statistics once a call drops from the queue.

13. The method of claim 12 further comprising the step of:
posting said statistics on a web-site accessible to the subscriber.

14. A computer program product having a medium with a computer program embodied thereon for queuing callers in a telephone network on behalf of a subscriber, said computer program product comprising:

computer program code for routing a call intended for said subscriber to a specially equipped network telephone switch and associated queue server;

computer program code for giving control of the call to said queue server;

computer program code for having said queue server instruct said switch to attempt to establish a connection with the subscriber; and computer program code for placing the call into a queue if a connection with the subscriber cannot be established;

wherein said computer program code for routing a call comprises:

computer program code for receiving a telephone call into an original switch made to a directory number in a zone of portability as determined by NPA-NXX digits of the directory number called;

in the original switch, computer program code for querying an Local Number Portability (LNP) SCP for a location routing number for said specially equipped network telephone switch;

in the LNP SCP, computer program code for performing an internal database search for the location routing number of said specially equipped network telephone switch and returning the location routing number to the original switch; and in the original switch, computer program code for routing the call including the directory number called, via the location routing number, to the specially equipped network telephone switch.

15. The computer program product of claim 14 further comprising:

computer program code for connecting queued calls to a broadcast music trunk.

16. The computer program product of claim 14 further comprising:

computer program code for having said queue server periodically attempt to call the subscriber; and computer program code for having said queue server instruct said switch to attempt to establish a connection with the subscriber; and computer program code for leaving the call in the queue if a connection with the subscriber cannot be established.

17. The computer program product of claim 16 further comprising:

computer program code for having said queue server collect statistics once a call drops from the queue.

18. The computer program product of claim 17 further comprising:

computer program code for posting said statistics on a web-site accessible to the subscriber.

* * * * *